United States Patent [19]

Shiokawa et al.

[11] Patent Number: 5,486,860
[45] Date of Patent: Jan. 23, 1996

[54] VIDEO CAMERA WITH AUTOFOCUS FUNCTION AND METHOD OF CONTROLLING THE SAME

[75] Inventors: Junji Shiokawa; Hiroshi Chiba; Toshio Murakami; Yoshihiro Todaka; Ichiro Ohsaka, all of Yokohama; Takashi Azumi, Katsuta, all of Japan

[73] Assignee: Hitachi, Ltd., Tokyo, Japan

[21] Appl. No.: 417,440

[22] Filed: Apr. 6, 1995

Related U.S. Application Data

[63] Continuation of Ser. No. 154,263, Nov. 18, 1993, abandoned.

[30] Foreign Application Priority Data

Nov. 30, 1992 [JP] Japan .................................. 4-320339

[51] Int. Cl.$^6$ ............................................. H04H 5/232
[52] U.S. Cl. ............................ 348/354; 348/347; 348/349
[58] Field of Search ............................ 348/345, 347, 348/349, 354, 356

[56] References Cited

U.S. PATENT DOCUMENTS

| | | | |
|---|---|---|---|
| 4,043,642 | 8/1977 | Hirose et al. | 350/184 |
| 4,842,387 | 6/1989 | Murakami et al. | 348/347 |
| 4,847,650 | 7/1989 | Iida et al. | 354/400 |
| 4,920,369 | 4/1990 | Kaneda et al. | 354/400 |
| 4,920,420 | 4/1990 | Sano et al. | 358/227 |
| 4,950,054 | 8/1990 | Wada et al. | 348/347 |
| 5,164,756 | 11/1992 | Hirasawa | 348/345 |

FOREIGN PATENT DOCUMENTS

0485163A2 of 0000 European Pat. Off. .......... G02B 7/28

| | | |
|---|---|---|
| 4-21276 | 4/1977 | Japan . |
| 2-81012 | 3/1990 | Japan . |

OTHER PUBLICATIONS

Ookawa, Katsuhiro, et al. "Auto–Focus Technology for Video Movie Cameras," Mitsubishi Electric Advance, vol. 57, Dec. 1991, pp. 32–33. (English).

*Primary Examiner*—Donald J. Yusko
*Assistant Examiner*—Michael Day
*Attorney, Agent, or Firm*—Fay, Sharpe, Beall, Fagan, Minnich & McKee

[57] ABSTRACT

A video camera has a memory for storing the position of an image lens in relation to the position of a variator lens, that is, zoom tracing curves in respect of individual subject distances, a motor for moving the image lens while vibrating it slightly during zooming operation, a variation component extractor circuit for extracting the amplitude and phase of a slight variation component of focusing voltage generated by moving the image lens while vibrating it slightly, and a controller for controlling drive means on the basis of the stored zoom tracing curves and an extracted slight variation component. During zooming operation, the controller first controls the motor in compliance with a position of the variator lens pursuant to a zoom tracing curve stored in the memory in association with a position assumed by the image lens immediately before start of the zooming operation. The controller also operates to correct a drive amount of the image lens on the basis of amplitude of an extracted slight variation component and when the amplitude of the slight variation component falls below a predetermined value, the controller controls the motor pursuant to a newly determined zoom tracing curve.

19 Claims, 8 Drawing Sheets

F I G. 5
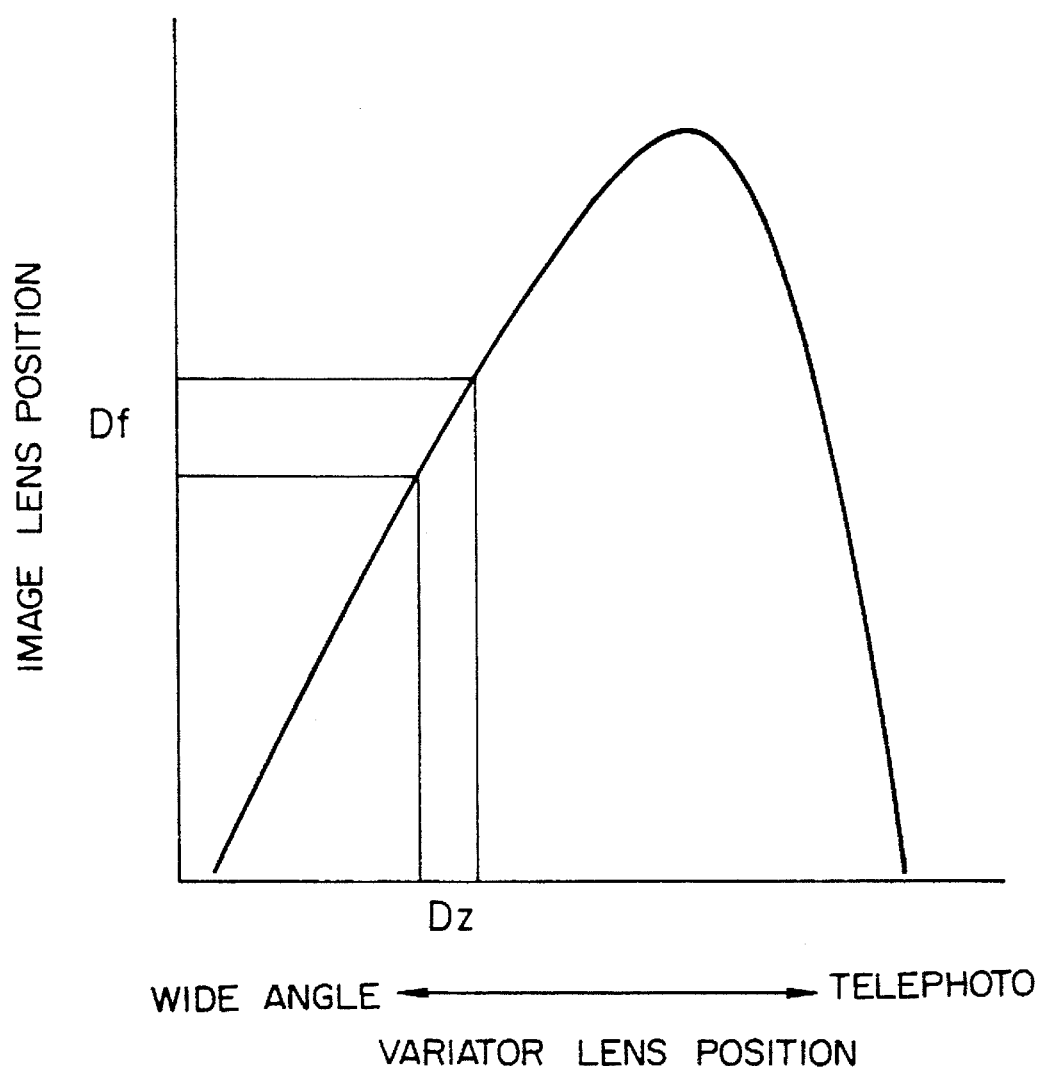

VIDEO CAMERA WITH AUTOFOCUS FUNCTION AND METHOD OF CONTROLLING THE SAME

This is a continuation of application Ser. No. 08/154,263, filed Nov. 18, 1993, now abandoned.

BACKGROUND OF THE INVENTION

1. Field of the Invention

The present invention relates to a method of controlling a video camera with autofocus function and more particularly to a method of controlling a drive of a lens for focusing (image lens or focusing lens) in order that occurrence of out-of-focus can be prevented during zooming operation (zoom magnification changing operation).

2. Description of the Related Art

Widely known as a control method for the video camera with autofocus function is a video signal detecting method wherein a high frequency band component contained in a brightness signal of a video signal from an image sensor is taken out, levels of high frequency band component within a predetermined imaging range are integrated to produce a focusing voltage, and the lens position is controlled such that the focusing voltage is maximized. On the other hand, an optics of the inner focus type in which focusing is effected by an image lens disposed at the final stage of a lens system is widely used in, for example, a public camcorder (video camera integral with VCR) because of advantages of light weight and compactness. In the lens configuration of the inner focus type, however, the image lens is disposed behind a variator lens, raising a problem that the in-focus position of the image lens changes as the zooming operation proceeds.

To cope with this problem, in the technique described in JP-A-4-21276, with the aim of making an image lens follow an in-focus point in response to zooming operation, the position of the image lens is corrected such that out-of-focus does not take place during zooming operation by paying out the image lens by a predetermined amount in a predetermined direction when a focusing voltage falls below a predetermined threshold value during the zooming operation.

In this conventional technique, however, the image lens is not driven before the focusing voltage during the zooming operation falls below the predetermined threshold value, with the result that depending on an object, an operation of repeating the out-of-focus state and the in-focus state tends to occur; and when out-of-focus has already taken place upon start of the zooming, it is difficult to draw the image lens into the in-focus state during the zooming operation.

Further, most zoom lens used in the aforementioned public camcorder are of the inner focus type which are particularly removed of a compensator lens. FIG. 2 shows, with parameters of several subject distances, characteristics (zoom tracing curves) representing the in-focus position of the image lens in relation to the magnification (the position of the variator lens) which are obtained with the compensator lens removed. For example, when an object at an infinitely far distance is imaged, the in-focus position of the image lens traces the lowermost zoom tracing curve of FIG. 2 as the zooming is operated from wide angle to telephoto. As the subject distance decreases, the zoom tracing curve shifts to those of subject distances B and A (distance A<distance B). The uppermost zoom tracing curve of FIG. 2 then corresponds to a near distance. Since the zoom tracing curves are steeper than those of the conventional zoom lens with compensator, the image lens is required to follow the movement of the variator lens more rapidly. Further, because of speed-up of the zooming, it is very difficult to correct and drive the image lens smoothly without out-of-focus during the zooming operation.

U.S. Pat. No. 4,842,387 discloses an automatic focusing apparatus for video camera in which a variation signal of a high frequency band component contained in a video signal is generated when one optical element of a focusing lens system is vibrated slightly and focusing is effected on the basis of the polarity and magnitude of the variation signal.

SUMMARY OF THE INVENTION

The present invention intends to solve the above problems and it is an object of the invention to provide a video camera which can control automatic focusing smoothly without causing out-of-focus even during zooming operation.

To accomplish the above object, the present invention comprises a memory for storing the image lens position in relation to the variator lens position, that is, zoom tracing curves in respect of individual subject distances, drive means for moving an image lens while vibrating it slightly during zooming operation, variation component extractor means for extracting the amplitude and phase of a slight variation component of focusing voltage when the image lens is moved while being vibrated slightly, and control means for controlling the drive means on the basis of the stored zoom tracing curves and the extracted slight variation component.

More specifically, during the zooming operation, the control means first controls the drive means in accordance with a variator lens position pursuant to a zoom tracing curve stored in the memory means in relation to an image lens position immediately before start of the zooming operation. The control means also corrects a drive amount of the image lens on the basis of amplitude of an extracted slight variation component. Then, when the amplitude of the slight vibration component falls below a predetermined value, the control means controls the drive means pursuant to a newly determined zoom tracing curve.

At that time, if the image lens position shifts from an actual in-focus point, the control means obtains from the slight variation extractor means the amplitude and phase of a slight variation component of focusing voltage generated by moving the image lens while vibrating it slightly. The control means decides a degree of the shift from the in-focus position on the basis of the amplitude and decides whether the shift is in a direction toward a near distance or an infinitely far distance. Accordingly, the control means determines a direction for drive of correction of the image lens in accordance with the phase and a drive amount of the image lens in accordance with the amplitude, and drives the image lens for correction thereof on the basis of the thus determined drive correction direction and drive amount.

According to the present invention, since the image lens is always driven and corrected on the basis of the stored zoom tracing curves in compliance with a movement of the variator lens, the image lens can follow the in-focus point smoothly even during the zooming operation and out-of-focus can be prevented.

BRIEF DESCRIPTION OF THE DRAWINGS

The present invention will be more apparent from the following detailed description, when taken in conjunction with the accompanying drawings, in which:

FIG. 5 is a graph showing an example of the relation between the image lens displacing amount and the variator lens displacing amount;

DESCRIPTION OF THE PREFERRED EMBODIMENTS

Preferred embodiments of the present invention will now be described.

Figure 1:
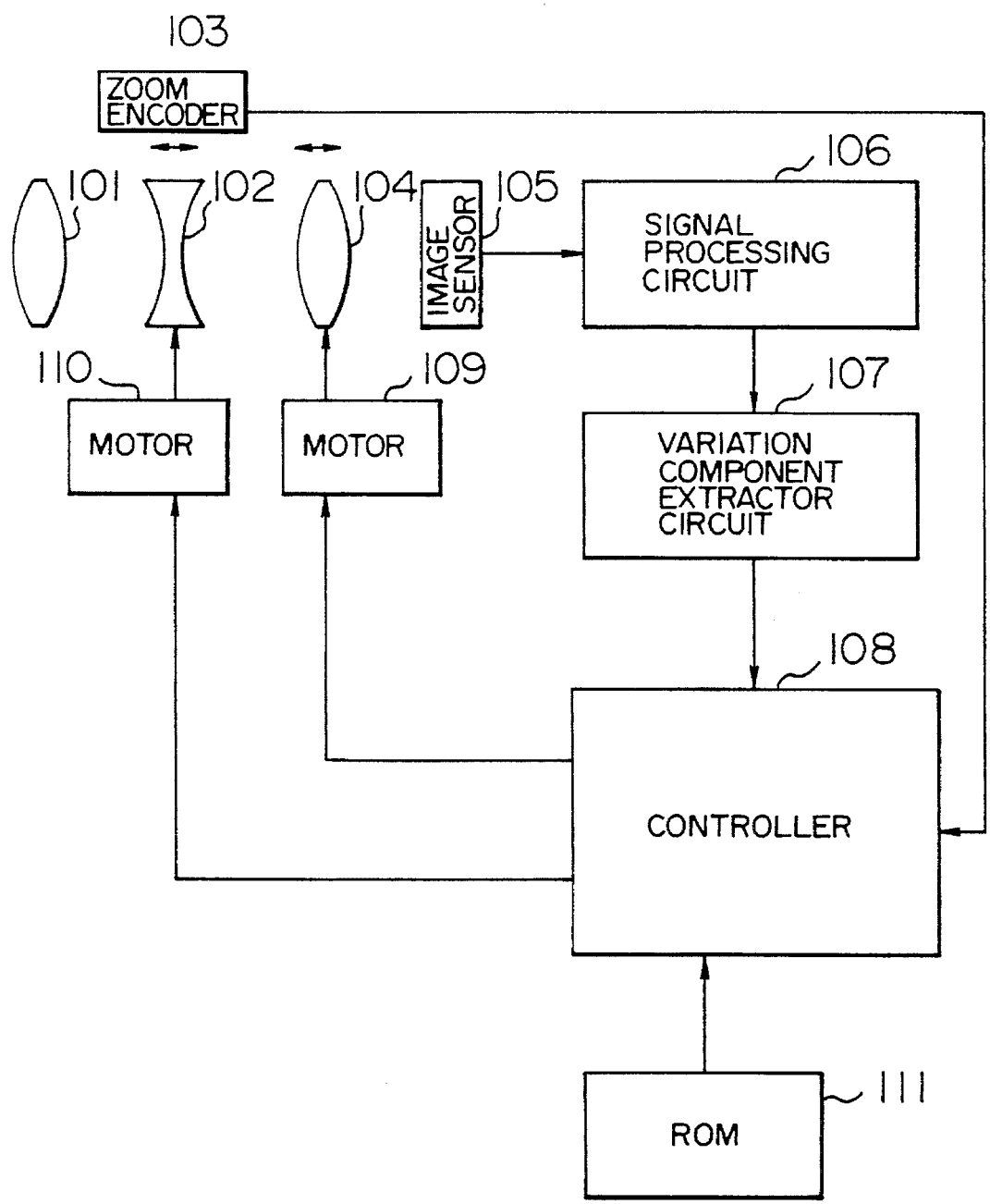
FIG. 1 is a block diagram showing the principal part of an embodiment of a video camera according to the invention.

FIG. 1 is a block diagram showing the principal part of a video camera with autofocus function to which control techniques according to embodiments of the present invention are applied. The video camera comprises an objective lens 101, a variator lens 102, a zoom encoder 103 for delivery of positional information, an image lens 104, an image sensor 105, a signal processing circuit 106 for converting a signal produced from the image sensor 105 into a video signal and performing integral detection of a high frequency band component contained in a brightness signal of the video signal to deliver a focusing voltage, a variation component extractor circuit 107 for extracting a predetermined variation component of the focusing voltage, and a microcomputer. The video camera further has a controller 108 for drive control of the image lens 104 and variator lens 102, a ROM (Read Only Memory) 111 for storing zoom tracing curves, a focus motor 109 constructed of, for example, a stepping motor and adapted to drive the image lens 104, and a zoom motor 110 constructed of, for example, a DC motor and adapted to drive the variator lens 102.

An image of an object is focused on the image sensor 105 through the objective lens 101, variator lens 102 and image lens 104 and converted into an electric signal. The signal processing circuit 106 converts an output of the image sensor 105 into a video signal and performs integral detection of a high frequency band component contained in a brightness signal of the video signal to deliver a focusing voltage having a characteristic which assumes a maximum value at an in-focus point to the variation component extractor circuit 107. FIG. 3B shows a characteristic curve of focusing voltage assuming a maximum value at an in-focus point Po. FIG. 3B also shows phases of variation components of the focusing voltage which are obtained when the image lens 104 is slightly vibrated at the same phase at points A and B on the characteristic curve, respectively. Thus, when vibrations of the image lens 104 are in phase with each other, the phases of variation components of the focusing voltage are opposite to each other at the points A and B. Accordingly, a direction in which the image lens 104 is to be driven toward the in-focus point Po can be obtained from the vibration phase of the image lens 104 and the variation component phase of the focusing voltage.

Figure 3A:
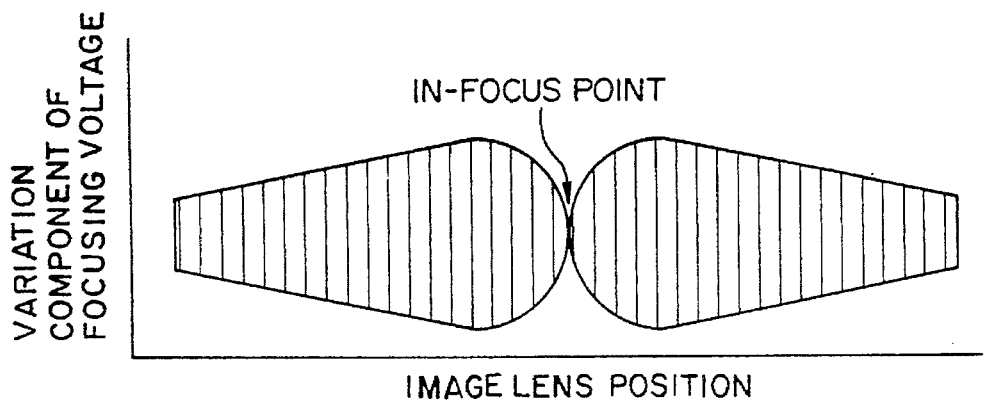
FIG. 3A is a diagram showing a variation component of focusing voltage.
Figure 3B:
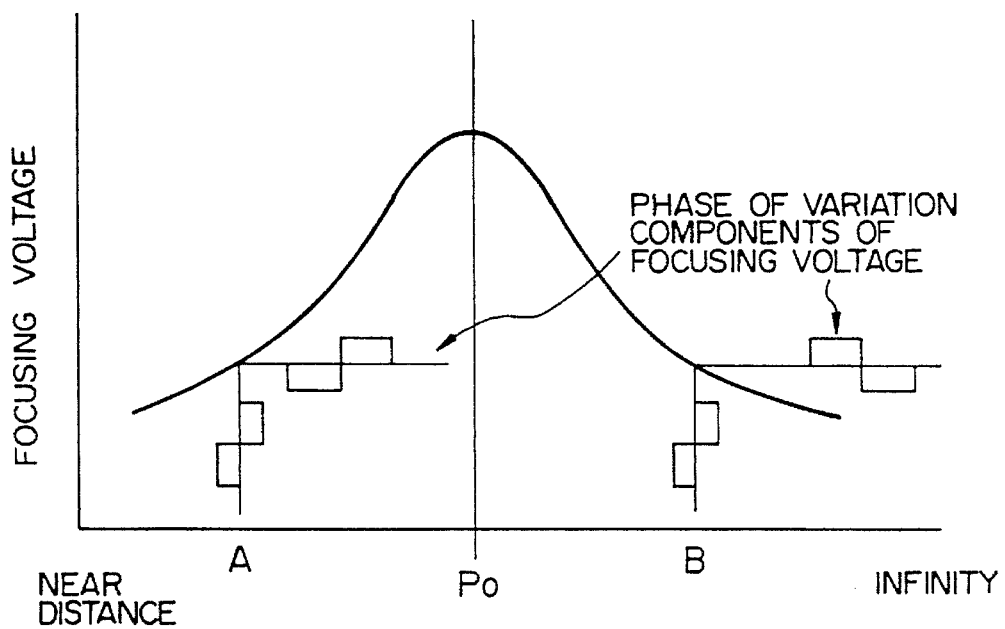
FIG. 3B is a graph showing the relation between the image lens position and the focusing voltage.

FIG. 3A shows the amplitude of a variation component of focusing voltage obtained when the image lens 104 is moved from a near distance to an infinitely far distance while being vibrated slightly. The amplitude takes a value of nearly zero near the in-focus point. Accordingly, the image lens 104 can be decided as to whether to be at the in-focus point by using the amplitude value.

Figure 4:
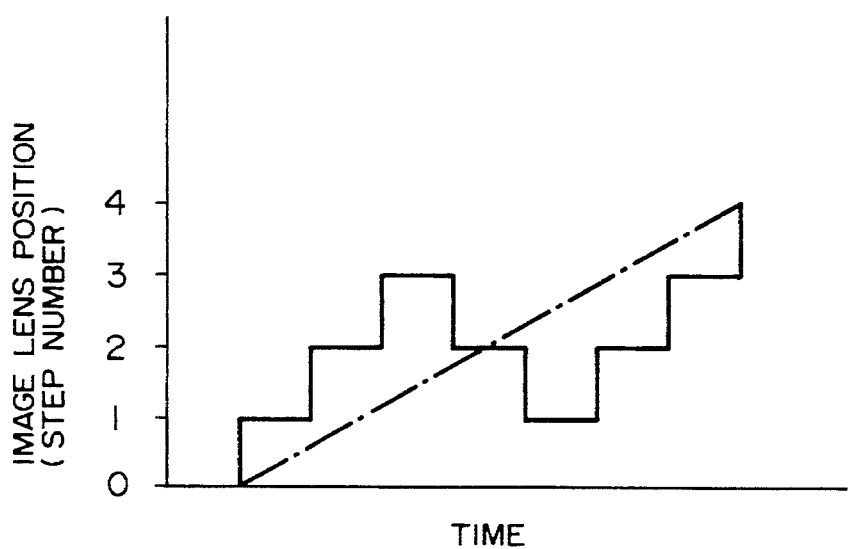
FIG. 4 is a graph showing an example of an image lens moving pattern when the image lens is moved while being vibrated slightly in the embodiment of the invention.

FIG. 4 shows a drive method of moving the image lens 104 by 4 steps while vibrating it slightly. In this case, the focus motor 109 is constructed of a stepping motor. As shown in FIG. 4, when the image lens 104 is driven by 3 steps in the forward direction, by 2 steps in the backward direction and by 3 steps in the forward direction, it can be vibrantly moved about the center ramp indicated by chained line. The vibration amplitude of the image lens 104 may be set to such an amount that when an image obtained from the image sensor 105 is seen visually, a fluctuation of image due to the vibration of the image lens 104 is not appreciable.

Figure 2:
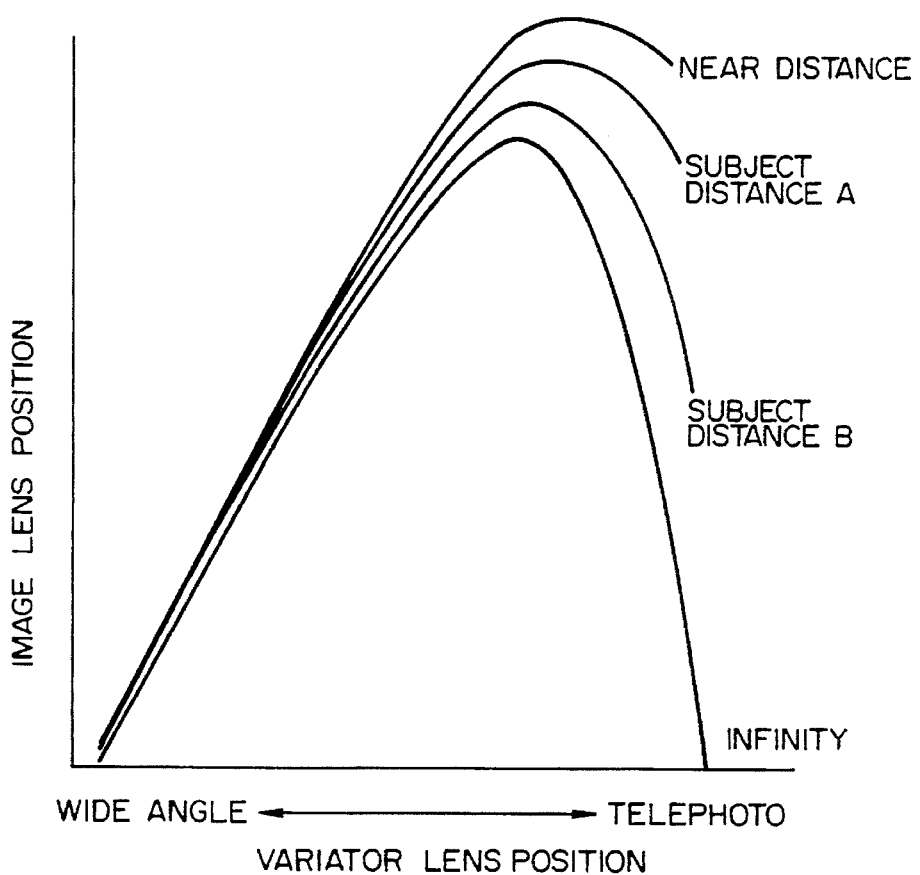
FIG. 2 is a graph showing zoom tracing curves representing the image lens in-focus point position in relation to the variator lens position in respect of individual subject distances.

Accordingly, when the image lens 104 is driven along one of the zoom tracing curves shown in FIG. 2 while the variator lens 102 is being driven, that zoom tracing curve can be decided as to whether to be one which shifts from the in-focus point toward a near distance or an infinitely far distance (infinity) by using the phase of a variation component of focusing voltage delivered out of the variation component extractor circuit 107. The degree of out-of-focus can be decided by the amplitude of a variation component of focusing voltage.

FIG. 5 shows the relation between displacement Dz of the variator lens 102 and displacement Df of the image lens 104 when the image lens 104 is driven along the zoom tracing curve for infinitely far distance. The variator lens 102 is driven by the zoom motor 110 rotatable at a predetermined speed under the control of the controller 108. Since positions of the variator lens 102 during driving are given in the form of outputs of the zoom encoder 103 and inputted to the controller 108, the controller 108 responsive to the outputs of the zoom encoder 103 can detect that the variator lens 102 displaces by Dz during a predetermined interval of time. On the basis of a detection result and the zoom tracing curve stored in the ROM 111, the controller 108 vibrantly moves the image lens 104 stepwise by Df. The controller 108 repeats this operation at predetermined time intervals to vibrantly move the image lens 104 along the zoom tracing curve stored in the ROM 111. On the basis of an output of the variation component extractor circuit 107, the controller 108 decides an out-of-focus amount and a focusing direction during zooming operation, adds correction amounts to the drive amount of the image lens 104 on the stored zoom tracing curve in accordance with the out-of-focus amount and the focusing direction, drives the image lens 104, and changes the zoom tracing curve in use at the time that the variation component of focusing voltage falls below a predetermined value.

The image lens 104 is moved in accordance with the zoom trace curve and with this intended slight vibration. For the case that the output of the variation component extractor circuit 107 is increased so that the out of focus state of the image becomes rather large, so that the focusing state can be easily discriminated, it is necessary to adjust the movement of the image lens to place the image back in focus. Accordingly, the shift amount of the image lens 107 to be obtained on the basis of the zoom trace curve is controlled to regain an in-focus state by increasing or decreasing the shift amount so that the image lens 104 is allowed to follow the in-focus point along the predetermined in-focus curve smoothly without causing out of focus even during a zooming operation. Such a control is described more in detail hereinafter. In this manner, according to the video camera of the present embodiment, the image lens 104 is allowed to follow the in-focus point smoothly without causing out,of-focus even during zooming.

Figure 6:
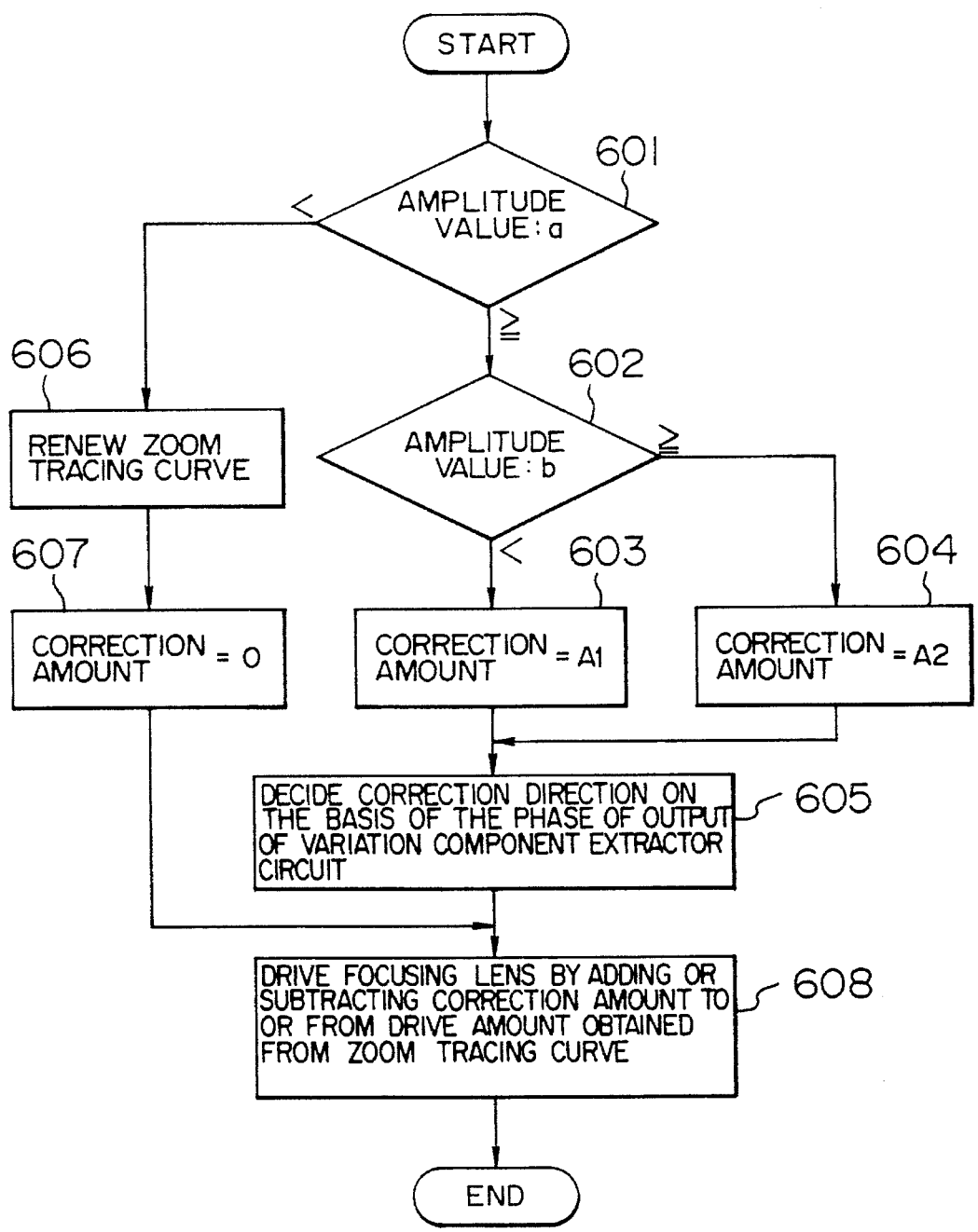
FIG. 6 is a flow chart showing an embodiment of control algorithm of the present invention.

FIG. 6 shows a flow chart of an embodiment of a control algorithm in the video camera. In step 601, the magnitude of amplitude of an output of the variation component extractor circuit 107 is compared with a threshold value a. If the amplitude of the output of the variation component extractor circuit 107 is larger than the threshold value a, the procedure proceeds to step 602 but if smaller, the procedure proceeds to step 606. In step 602, the magnitude of amplitude of the output of the variation component extractor circuit 107 is compared with a threshold value b. If the amplitude of the output of the variation component extractor circuit 107 is larger than the threshold value b, the procedure proceeds to step 604 but if smaller, the procedure proceeds to step 603. The correction amount for drive of the image lens is set to A2 in step 604 and the correction amount is set to A1 (A1<A2) in step 603. Then the procedure proceeds to step 605. In step 605, a correction direction is decided in accordance with a phase of the output of the variation component extractor circuit 107, and the procedure proceeds to step 608. On thee other hand, if in step 601 the amplitude of the output of the variation component extractor circuit 107 is determined to be smaller than the threshold value a, this condition is regarded as an in-focus state and the zoom tracing curve to be traced is renewed to a zoom tracing curve which extends along the image lens position at that time. Then the procedure proceeds to step 607. In step 607, the correction amount is set to zero and the procedure proceeds to step 608. Then, in step 608, the correction amount determined through the steps 601 to 607 is added to or subtracted from the drive amount obtained from the zoom tracing curve and the driving control is carried out while vibrating the image lens 104 slightly in accordance with a corrected drive amount. For example, when the focusing direction is determined as associated with a near distance, the correction amount is added but when determined as associated with an infinitely far distance, the correction amount is subtracted.

Figure 7:
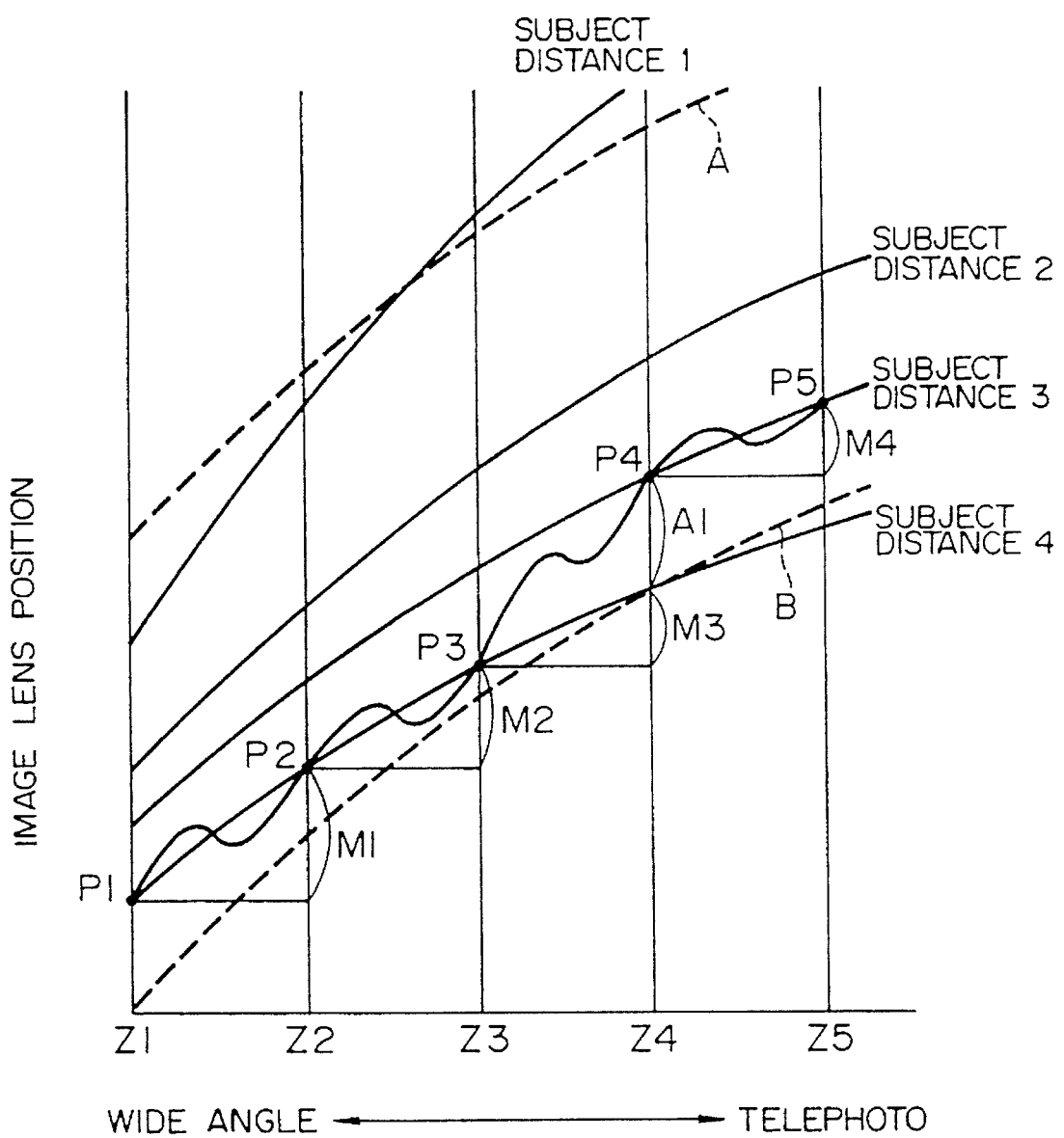
FIG. 7 is a graph showing an example of the correcting drive state of the image lens when a zooming operation is carried out pursuant to the control algorithm shown in FIG. 6.

FIG. 7 shows movements of the variator lens position and the image lens position obtained when zooming control is carried out in accordance with the control algorithm of FIG. 6. Characteristic curves designated by subject distance 1 to subject distance 4 represent zoom tracing curves precedently stored in the ROM 111. It is now assumed that an object which is brought into in-focus on a zoom tracing curve of distance 2 is imaged during zooming operation. Dotted curves A and B define a range within which the object can be imaged without causing a conspicuous out-of-focus, that is, an allowable depth of focus for the zoom tracing curve of distance 2. In other words, so long as the object at distance 2 is imaged within the range defined by the dotted curves A and. B, out-of-focus hardly occurs. On the assumption that at the time that zooming operation starts, the variator lens 102 and image lens 104 are positioned at P1 on the zoom tracing curve of distance 4 within the range of allowable depth of focus for distance 2, zooming operation is conducted from the zoom start position in the telephoto direction and the variator lens 102 is driven at a predetermined speed toward telephoto.

Firstly, at the termination of a predetermined time t, the variator lens 102 is moved from point Z1 to Z2 by zooming operation. Then, under the initial condition, the image lens 104 is driven by a drive amount M1 determined by the zoom tracing curve of distance 4 while being vibrated so as to be moved to a point P2. At that time, since the image lens 104 is at the P2 point and does not go beyond the range defined by the dotted curves A and B and the output of the variation component extractor circuit 107 is smaller than the threshold value a, the correction amount is set to zero through steps 601, 606 and 607. Then, the variator lens 102 is on the other hand at the Z3 point and so the image lens 104 is moved by a drive amount M2 determined by the zoom tracing curve of distance 4 while being vibrated, through step 608 of FIG. 6, and the image lens 104 is moved to a point P3 on the zoom tracing curve of distance 4.

When the image lens 104 reaches the P3 point, the output amplitude of the variation component extractor circuit 107 becomes larger than the threshold value a. At that time, the output amplitude of the variation component extractor circuit 107 is however smaller than the threshold value b. Then, the variator lens 102 is moved toward a point Z4. A correction amount for drive of the image lens 104 is then set to A1 through steps 601, 602 and 603 of FIG. 6. Thus, through step 608 of FIG. 6, the image lens 104 is driven by a moving amount which is a sum of a moving amount M3 determined by the zoom tracing curve of distance 4 and a correction amount A1 while being vibrated so as to be moved to a point P4.

Since the image lens 104 has been moved to the P4 position to approach the zoom tracing curve of distance 2 for in-focus point, the amplitude of variation component is set to below the threshold value a during the subsequent predetermined time t. Thus, the zoom tracing curve to be traced is renewed to that of distance 3 through the steps 601, 606 and 607 and the correction amount is set to zero. At that time, the variator lens 102 is moved toward a position Z5. Accordingly, through step 608 of FIG. 6, the image lens 104 is driven by a drive amount M4 determined by the zoom tracing curve of distance 3 while being vibrated so as to be moved to a point P5.

In this manner, by repeating the processing of FIG. 6 at intervals of predetermined time t, the image lens 104 can follow the movement of the variator lens 102 within the range of allowable depth of focus for the zoom tracing curve of distance 2 (within the range defined by dotted curves A and B). In accordance with a generation amount of slight variation component extracted during the zooming operation, the moving speed of the image lens is set. Accordingly, drive of the image lens 104 can be controlled during the zooming operation without causing out-of-focus.

Figure 8:
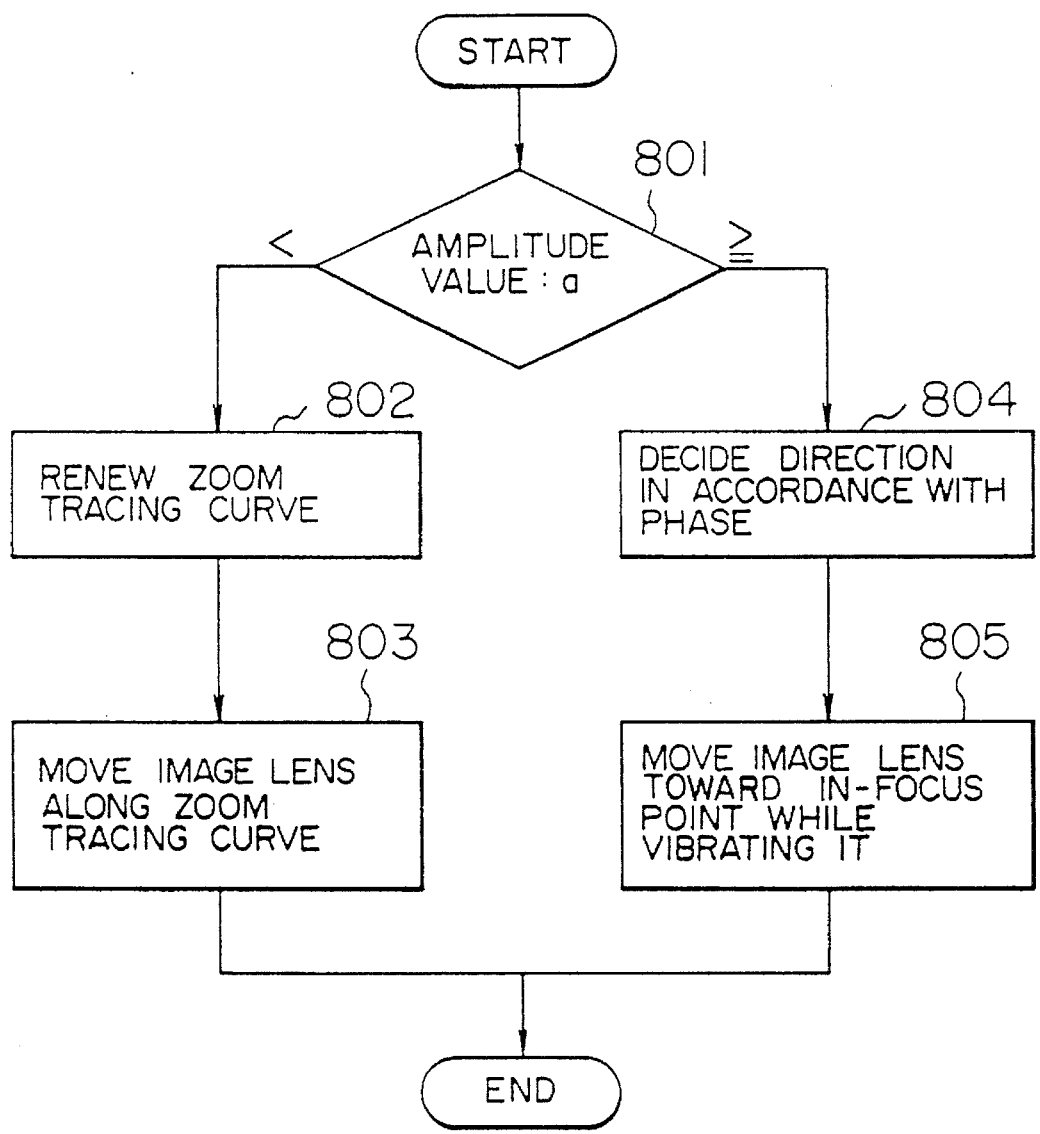
FIG. 8 is a flow chart showing another embodiment of control algorithm of the invention.

FIG. 8 is a flow chart showing a second embodiment of control algorithm in the video camera. Firstly, in step 801, an amplitude value of a variation component of focusing voltage produced from the variation component extractor circuit 107 is compared with the threshold value a. If the amplitude component is smaller than the threshold value a, the control program proceeds to step 802 but if the amplitude component is larger than the threshold value a, the control program proceeds to step 804. With the amplitude component being smaller than the threshold value a, the zoom tracing curve to be traced is renewed in step 802 and the control program proceeds to step 803. In step 803, the image lens 104 is moved along the zoom tracing curve while being vibrated. On the other hand, if the amplitude value of the variation component exceeds the threshold value a, a focusing direction is decided by a phase of the variation component in step 804 and the control program proceeds to step 805. In step 805, the image lens is moved at a predetermined speed in the focusing direction regardless of the zoom tracing curve, that is, in accordance with the ordinary autofocus loop.

Figure 9:
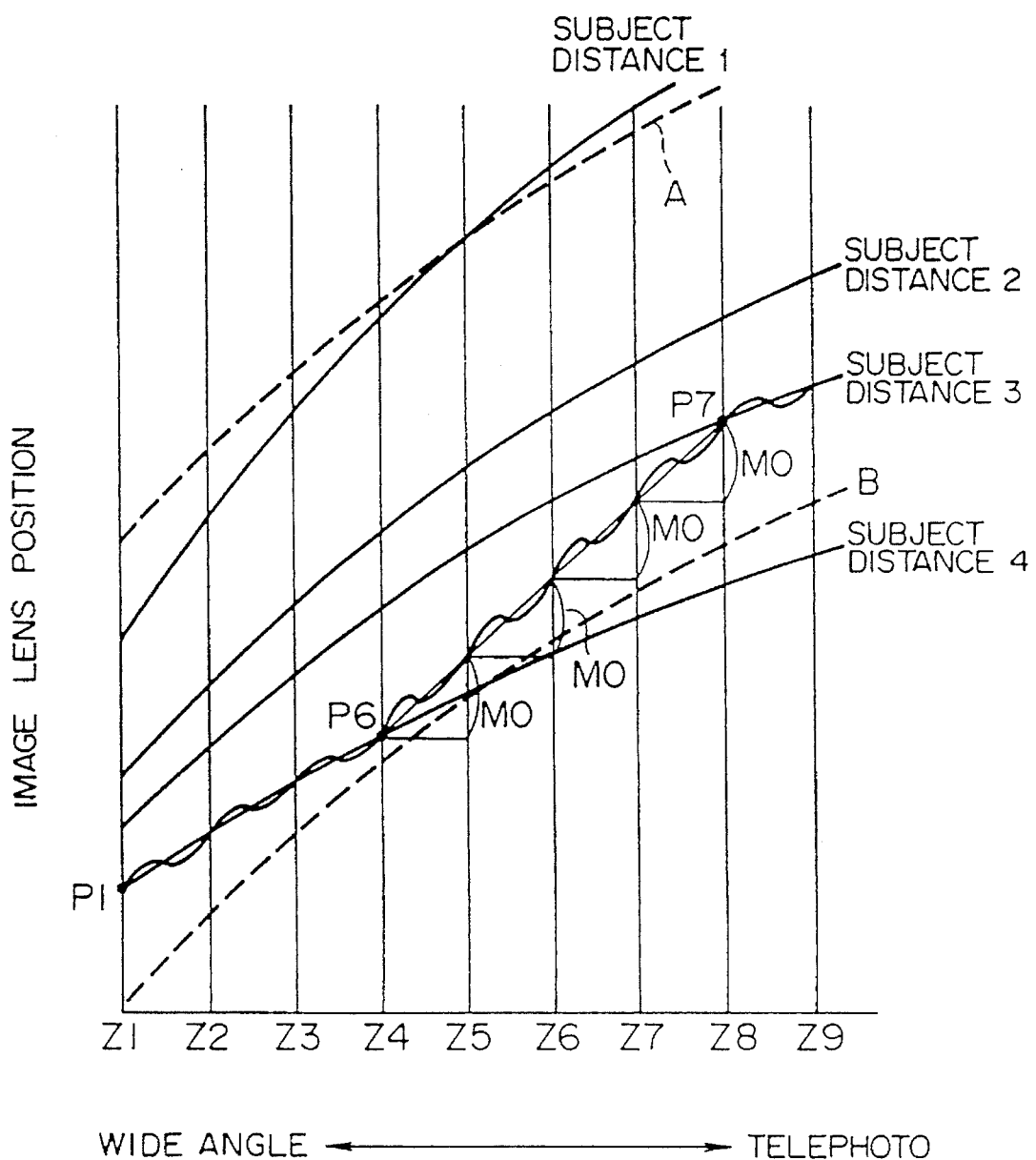
FIG. 9 is a graph showing an example of the correcting drive state of the image lens when a zooming operation is carried out pursuant to the control algorithm shown in FIG. 8.

FIG. 9 shows movements of the variator lens position and image lens position obtained when zooming control is conducted in accordance with the control algorithm of FIG. 8. Respective zoom tracing curves of distance 1 to distance 4, dotted curves A and B, the conditions for an object to be imaged and the conditions for start of zooming operation are the same as those shown in FIG. 7, and the position of the variator lens 102 is moved from Z1 toward telephoto through Z2, Z3, ..., Z9 at intervals of a predetermined time t.

At the time that zooming operation starts, the variator lens 102 and image lens 104 are positioned at P1 point. Accordingly, through step 803 of FIG. 8, the image lens 104 is moved along the zoom tracing curve of distance 4 on which the P1 point lies while being vibrated to follow movement of the variator lens 102. By repeating this processing, the image lens 104 reaches a point P6 while following the movement of the variator lens 102.

When the image lens 104 arrives at the P6 point, the amplitude value of the variation component of focusing voltage is determined to be lager than the threshold value a through step 801 of FIG. 8. Then, a focusing direction is decided by a phase of the variation component through step 804 of FIG. 8 and the image lens 104 is driven every predetermined time t by a drive amount of MO (constant) through step 805. Through the above control, the image lens 104 is moved to a point P7 while being vibrated.

At the time that the image lens 104 reaches the P7 point, the amplitude value of the variation component of focusing voltage is determined to be smaller than the threshold value a through step 801 of FIG. 8. Then, through step 802 of FIG. 8, the zoom tracing curve of distance 3 crossing the P7 point is set to be have as a new zoom tracing curve along which the image lens 104 is moved and through step 803, the image lens 104 is moved along this curve while being vibrated.

Accordingly, by repeating the processing of FIG. 8 at intervals of predetermined time t, the image lens 104 can follow the movement of the variator lens 102 within the range of allowable depth of focus for the zoom tracing curve of distance 2 (within the range defined by dotted curves A and B), so that driving of the image lens 104 can be controlled without causing out-of-focus during the zooming operation.

The foregoing two embodiments have been described as being applied to movement control of the image lens but the principle of control holds true for a video camera in which the movement of such a lens as a variator lens is controlled. Accordingly, the application of the present invention is not limited to the video camera in which movement of the image lens is controlled.

We claim:

1. A video camera which performs autofocus by moving a focusing lens in accordance with information obtained from a video signal produced from an image sensor and changes the zooming magnification by moving a variator lens, comprising:

first drive means for moving said variator lens;

second drive means for moving said focusing lens including means for slightly vibrating said focusing lens on an optical axis;

detection means for detecting a direction and a degree of a shift of said focusing lens from an in-focus position on the basis of a phase and an amplitude of a variation component of the video signal produced from said image sensor;

memory means for storing a plurality of relations each defined between a position of said variator lens and a position of said focusing lens in respect of constant subject distances, one of said relations being used to form an image of an object located at a one of the constant subject distances; and control means for controlling said second drive means in accordance with the detected direction and degree of the shift by controlling, when said variator lens is moved by said first drive means, said second drive means in compliance with movement of said variator lens pursuant to a one of said relations which is specified by positions assumed by said variator leans and focusing lens when the direction and the degree of the shift is indicated by the variation component to be less than a predetermined value, and adjusting the movement of the focusing lens by a predetermined correction amount when the direction and degree of the shift is indicated by the variation component to be greater than the predetermined value so that said movement of said variator lens is made pursuant to a second one of said plurality of specified relations.

2. The video camera according to claim 1, wherein when a result of the detecting by said detection means exceeds the predetermined value in the moving of said variator lens by said first drive means, the adjusting by said control means, corrects the positions of the variator lens and the focusing lens to the second one of the specified relations and said control means controls said second drive means in compliance with movement of said variator lens pursuant to said second one of the specified relations.

3. The video camera according to claim 1, wherein when a result of the detecting by said detection means exceeds the predetermined value in the course of movement of said variator lens by means of said first drive means, said control means controls said second drive means by adding or subtracting the predetermined correction amount to or from a drive amount of said second drive means obtained pursuant to said specified relations.

4. The video camera according to claim 3, wherein when the detecting by said detection means exceeds the predetermined value, said control means controls said second drive means by adding or subtracting the predetermined correction amount to or from said drive amount and when the detecting by said detection means exceeds a second predetermined value, said control means controls said second drive means by adding or subtracting a second predetermined correction amount to or from said drive amount.

5. The video camera according to claim 1, wherein said memory means stores characteristic curves in respect to individual plural subject distances as said relations each defined between the position of said variator lens and the position of said focusing lens.

6. The video camera according to claim 1, wherein said detecting by said detection means comprises detecting a shift from the in-focus point on the basis of a focusing voltage obtained by integral detection of a high frequency band component contained in said video signal.

7. The video camera according to claim 6, wherein said detecting by said detection means of the phase and amplitude of the variation component comprises detecting a direction of the shift of said focusing lens from an in-focus point on a basis of a phase of a predetermined variation component of said focusing voltage generated by said slightly vibrating and detecting an amount of a shift of said focusing lens from the in-focus point on a basis of amplitude of said variation component.

8. The video camera according to claim 7, wherein said control means controls said second drive means such that said focusing lens moves at a speed set in accordance with the amount of amplitude of said variation component.

9. The video camera according to claim 1, wherein said first drive means is a DC motor and said second drive means is a stepping motor.

10. A method of controlling a video camera which performs autofocus by moving a focusing lens in accordance with focusing information obtained from a video signal produced from an image sensor and performs a zooming operation by moving a variator lens, comprising the steps of:

specifying, upon a start of the zooming operation effected by moving said variator lens, one of a plurality of positional relations between said focusing lens and said variator lens defined in respect of a plurality of subject distances and stored in advance, in accordance with positions assumed by said focusing lens and variator lens at the present time, respectively;

moving said focusing lens in compliance with movement of said variator lens pursuant to said one specified positional relation as said focusing lens is vibrated slightly;

detecting a direction and a degree of shift from an in-focus position of said focusing lens on the basis of a phase and an amplitude of a variation component of focusing voltage generated by the slight vibration of said focusing lens;

correcting, when the degree of shift is in excess of a predetermined value, a movement of said focusing lens determined pursuant to the specified positional relation by a predetermined correction amount by moving said focusing lens in compliance therewith so that a movement of said variator lens is made pursuant to a second one of said plurality of positional relations;

renewing, when the degree of shift does not exceed said predetermined value, said one specified positional relation in accordance with positions assumed by said focusing lens and variator lens at the present time, respectively; and upon said renewing, moving said focusing lens in compliance with said variator lens pursuant to a the one specified positional relation.

11. The control method for a video camera according to claim 10, wherein said predetermined value includes a plurality of levels, and correction values are preset for respective levels.

12. The control method for a video camera according to claim 10, wherein said positional relations are characteristic curves in respect of individual plural subject distances.

13. The control method for a video camera according to claim 10, wherein said detecting includes detecting focusing voltage obtained by integral detection of a high frequency band component contained in said video signal.

14. The control method for a video camera according to claim 13, wherein said focusing lens is moved in the forward/backward direction on the optical axis while being vibrated slightly, and said detecting includes detecting a direction of a shift of said focusing lens from the in-focus point which is obtained from a phase of the variation component of said focusing voltage generated by the slightly vibrating and an amount of the shift of said focusing lens from the in-focus point which is obtained from amplitude of said variation component.

15. The control method for a video camera according to claim 14, wherein said focusing lens is moved toward the in-focus point at a speed set in compliance with the amplitude of said variation component.

16. A method of controlling a video camera which performs autofocus by moving a focusing lens in accordance with focusing information obtained from a video signal produced from an image sensor and performs a zooming operation by moving a variator lens, comprising the steps of:

specifying, upon start of the zooming operation by moving said variator lens, one of a plurality of positional relations between said focusing lens and said variator lens defined in respect of a plurality of subject distances and stored in advance, in accordance with positions assumed by said focusing lens and variator lens at the present time, respectively;

moving said focusing lens in compliance with movement of said variator lens pursuant to said specified positional relation including slightly vibrating said focusing lens along an optical axis;

detecting a direction and a degree of shift from an in-focus position of said focusing lens on the basis of a phase and an amplitude of a variation component of focusing voltage generated by the slightly vibrating of said focusing lens;

correcting, when the degree of shift is in excess of a predetermined value, a movement of said focusing lens determined pursuant to the specified positional relation by a predetermined correction amount by moving said focusing lens in compliance therewith so that said moving is in compliance with a second one of said plurality of positional relations;

renewing, when the degree of shift does not exceed said predetermined value, said one specified positional relation in accordance with positions assumed by said focusing lens and variator lens at the present time, respectively; and moving said focusing lens in compliance with said variator lens pursuant to said one specified positional relation.

17. The control method for a video camera according to claim 16, wherein said positional relations are characteristic curves in respect of individual plural subject distances.

18. The control method for a video camera according to claim 16, wherein said detecting includes detecting a focusing voltage obtained by integral detection of a high frequency band component contained in said video signal.

19. The control method for a video camera according to claim 18, wherein said detecting includes detecting a direction of a shift of said focusing lens from the in-focus point: which is obtained from a phase of the predetermined variation component of said focusing voltage generated by the slight variation and an amount of the shift of said focusing lens from the in-focus point which is obtained from amplitude of said variation component.

* * * * *

UNITED STATES PATENT AND TRADEMARK OFFICE
CERTIFICATE OF CORRECTION

PATENT NO. : 5,486,860
DATED : January 23, 1996
INVENTOR(S) : Junji Shiokawa, et al.

It is certified that error appears in the above-indentified patent and that said Letters Patent is hereby corrected as shown below:

On title page, item [22],

Filing date should be corrected to read: April 5, 1995

In the Claims:

Claim 3, column 8, line 50, delete "relations" and insert therefor --relation--.

Claim 19, column 10, line 60, delete "point:" and insert therefor --point--.

Signed and Sealed this

Twenty-third Day of April, 1996

Attest:

BRUCE LEHMAN

Attesting Officer

Commissioner of Patents and Trademarks